Patented Dec. 12, 1950

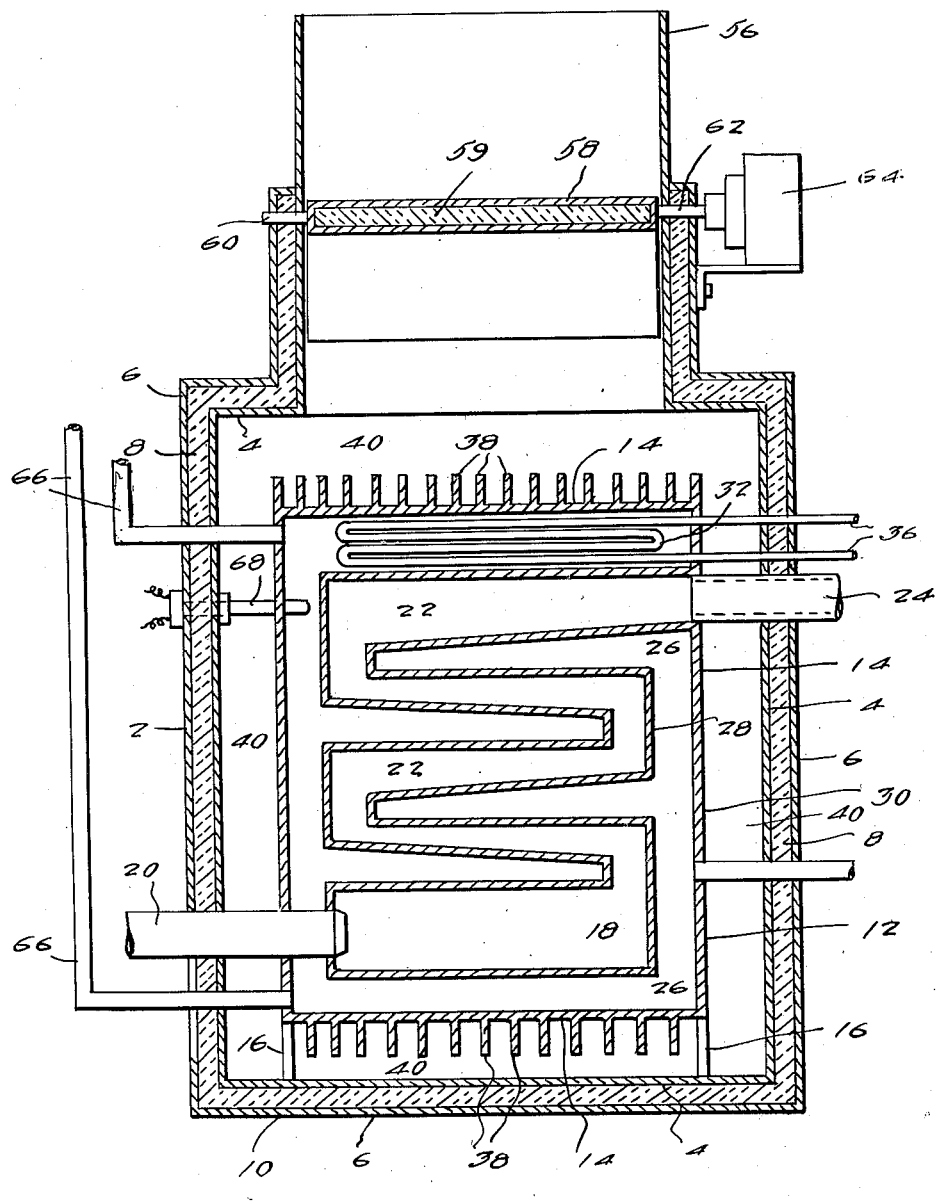

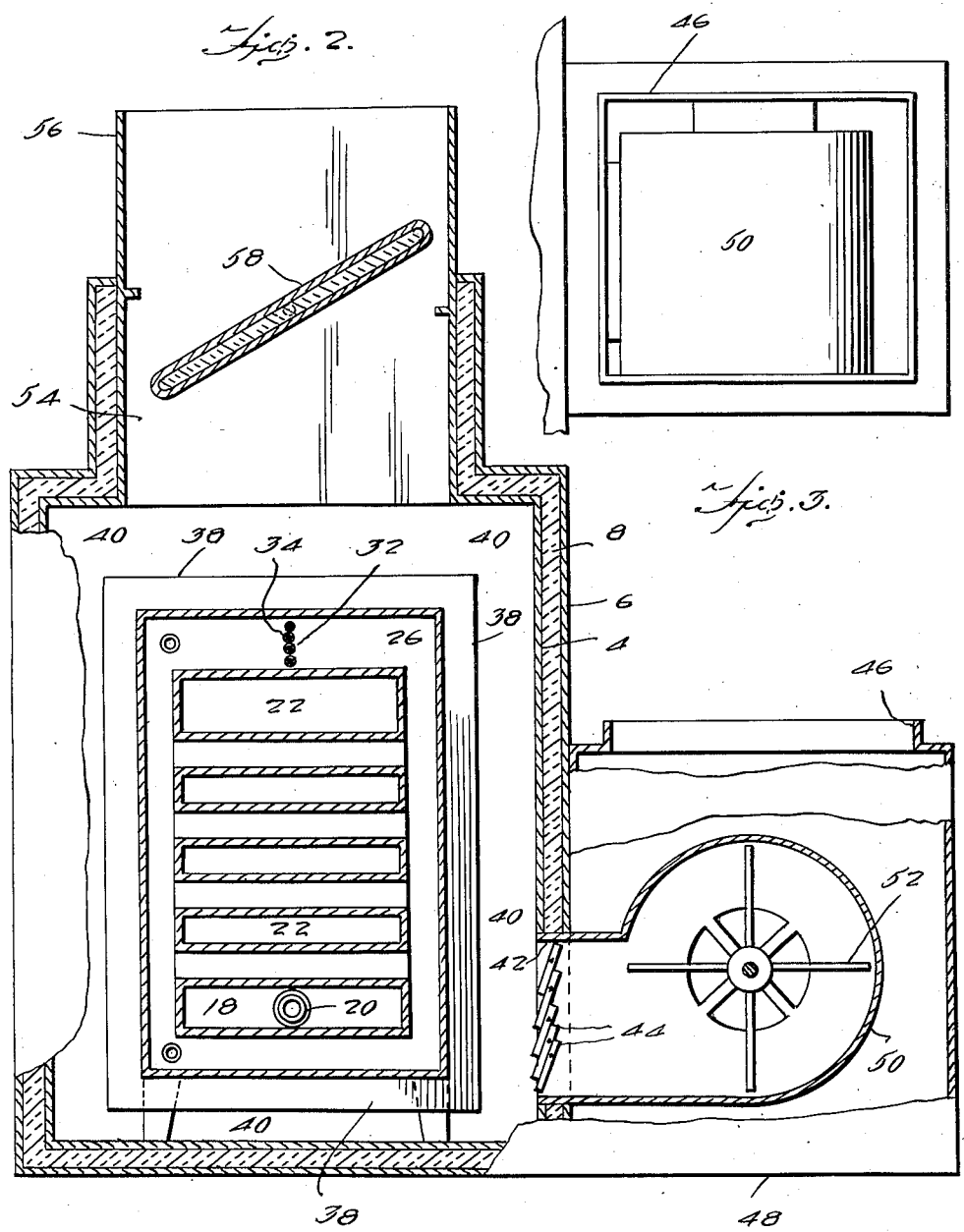

2,533,508

UNITED STATES PATENT OFFICE 2,533,508

FURNACE FOR HOT-AIR AND WATER SPACE HEATING WITH DOMESTIC WATER HEATER

Walter I. Riu, Philadelphia, Pa.

Application May 24, 1946, Serial No. 672,100

1 Claim. (Cl. 126—101)

This invention relates to devices for furnishing heat and hot water to buildings.

An object of this invention is to provide a source of heated air and hot water, which is also specially adapted for operation furnishing only hot water during the non-heating season.

Another object of the invention is to provide a heater for hot air and water, which is provided with automatic controls for efficient automatic operation.

A further object of the invention is to provide a hot air and hot water heater which is completely automatic in operation, simple in construction, relatively inexpensive in cost, and which may be used effectively with any desired type of heat source such as oil, gas or coal.

Another object of the invention is to provide a source of automatically controlled radiant heating, together with conditioned warm air and hot water.

Other and further objects of my invention will become apparent from the following description of a preferred embodiment thereof as illustrated in the accompanying drawings, and in which—

Figure 1 is a side elevation in section of my improved heating furnace,

Figure 2 is a front elevation in section of the furnace shown in Figure 1, and

Figure 3 is a plan fragmentary top view of the fan housing shown in Figure 2.

Reference is now had to the drawings in which like reference characters denote similar parts throughout the several views. In the drawings, there is an outer furnace casing 2 having inner and outer walls 4 and 6 between which insulating material 8 is disposed, the said walls 4 and 6 also extending along the bottom as shown and forming a base 10. The inner furnace casing 12 has its outer walls 14 spaced from the inner walls of the outer furnace casing 2, and is supported on legs 16. The combustion chamber 18 is fed with combustible mixtures by tube 20 leading from an oil burner or the like, for furnishing heat to the furnace, the hot burning gases being conducted through tortuous passageway 22 to the stack pipe 24 and thence to the stack. As shown, a water jacket chamber 26 is formed between the inner and outer walls 28 and 30 of the inner furnace casing 12, a hot water heating coil 32 being immersed in the water in the upper portion of the water jacket at 34, the pipes 36 leading from the heating coil 32 to an external hot water storage tank, not shown, or directly to the hot water pipes of the building if no tank is used.

Ribs or finned surfaces 38 project out of the outer wall 14 of the inner casing 12, from the top, bottom, and left and right sides as seen in Figure 2, but may be omitted from the left and right sides as seen in Figure 1. Since the air to be heated flows in the air heating space or chamber 40 all around the inner casing, the ribs 38 assist in maintaining maximum heat transfer to the said air.

Air is drawn into the air heating chamber 40 through air inlet aperture 42 formed in the outer casing, a number of self-closing balanced vanes or louvers 44 being pivoted in the opening 42 as shown to open when the fan is running and close when it stops, thus isolating the heat within the furnace. The air returns to the furnace through air return aperture 46 and flows through fan housing 48, being drawn in by suction of the rotating fan 50 having blades 52. Heated air is discharged out of the chamber 40 through plenum chamber 54 and upwards out through the hot air discharge outlet 56, a damper vane 58 being pivoted at 60 and 62 in the walls of the plenum chamber 54, the pivotal movement of the damper 58 being accomplished by a motor 64 turning the damper through suitable reduction gearing, not shown. The damper vane 58 has internal insulation 59.

Pipes 66 are the supply and return pipes which conduct water to and from radiators and radiant piping when used. Suitable piping is also provided to conduct water into the water jacket 26 of the inner casing.

By the use of this system, one unit can be used to furnish automatically controlled heated and conditioned warm air for a residence or building during the heating season, together with adequate hot water all the year around, and in addition radiators can be connected to the water jacket for furnishing a limited amount of radiation as required.

Suitable motorized controls are provided for the motor 64, the source of heat 20, and the fan 50 with its vanes 44, and in addition an automatic thermostatic hot water control element 68 is immersed in the water jacket chamber 26 for controlling water temperature in a manner well known in the art. The motorized control may be a two position automatic control that is composed mainly of an electrical motor, reduction gears and electrical setting device. With this system, the control is wired in series with the fan and thermostat, the damper being operable to assume an open or vertical position when the thermostat calls for heat. At the same time the fan will start running. When the desired temperature has been reached, the thermostat again acts, returning the damper to the closed or horizontal position and the fan shuts off. No complicated fan control is needed as the water or steam is always kept hot by the burner and therefore cannot blow cold air. In order to prevent the fan from working if there is a burner failure, the stack or safety control would be so wired or controlled as not to furnish current to the fan in that event.

During the summer months when no building heat is required, the insulated damper remains closed, adequate and heavy insulation in the damper, plenum chamber and outer casing serving to keep the heat within the boiler, the heat being furnished by an automatically operated oil burner, gas heater, or coal stoker, the immersion control 68 maintaining the desired water temperature. During the heating season thermostat in the living rooms calls for heat, thus thus opening the damper to its vertical position, thus allowing heated air to rise through the plenum chamber, the fan control being actuated as required to force the heated air up through the ducts to heat the house or building. When the desired temperature is reached, the thermostat operates the motor 64 to shut the damper and shuts off the fan. Even if the thermostat in the rooms does not call for heat, the hot water control 68 will turn the furnace on and off as required to maintain the desired hot water temperature. If the optional steam or water radiation is attached to this system the thermostat would also shut off the piping to the radiators through an automatic shut-off valve, which might be operated by a solenoid or otherwise.

Although I have described a preferred embodiment of my invention in specific terms, it is to be understood that various changes may be made in size, shape, materials and arrangement without departing from the spirit and scope of the invention as claimed.

I claim:

A heating device for connection to the inlet and return ducts of an air heating system comprising an insulated outer furnace casing, an inner furnace casing supported within said outer furnace casing and having its outer walls spaced from the inside of the outer casing to provide an air chamber therebetween, said outer furnace casing having an air intake and air discharge apertures formed therein and communicating with said air chamber, said air intake and air discharge apertures being adapted to be connected respectively with said inlet and return ducts of the air heating system, a combustion chamber disposed within said inner furnace casing, a tube extending through a wall of said combustion chamber for introducing a combustible mixture into the latter, means defining a tortuous passage within said inner furnace casing having one end connected to said combustion chamber and having the other end of said passage provided with an outlet for the discharge of the gases of combustion, the walls of said combustion chamber and said passage being spaced from said inner furnace casing to provide a water jacket chamber, a pipe in communication with the outlet of said passage for withdrawing the gases of combustion, a water heating element disposed within said water jacket chamber, means for introducing water to be heated into said heating element and withdrawing the heated water from the latter, fan means positioned exteriorly of said outer furnace casing and in communication with said air intake aperture, and a plurality of spaced superimposed self closing balanced louvers extending across said air intake aperture and mounted on said outer furnace casing to open inwardly of the latter named casing in response to the influence of a forced draft of air passing inwardly through said inlet aperture upon actuation of said fan means and to close upon cessation of the actuation of said fan means.

WALTER I. RIU.

REFERENCES CITED

The following references are of record in the file of this patent:

UNITED STATES PATENTS

| Number | Name | Date |
|---|---|---|
| 688,845 | Garfield | Dec. 17, 1901 |
| 1,685,710 | Leonhart | Sept. 25, 1928 |
| 1,726,921 | Ray | Sept. 3, 1929 |
| 2,006,849 | Warren | July 2, 1935 |
| 2,163,910 | Lattner | June 27, 1939 |
| 2,269,055 | Gower | Jan. 6, 1942 |
| 2,314,086 | Giffords | Mar. 16, 1943 |